United States Patent [19]

Maeba et al.

[11] Patent Number: 4,982,318
[45] Date of Patent: Jan. 1, 1991

[54] DC POWER SUPPLY HAVING BIPOLAR OUTPUTS

[75] Inventors: Yukio Maeba, Kyoto; Takahito Chinomi, Nagaokakyo, both of Japan

[73] Assignee: Murata Manufacturing Co., Ltd., Japan

[21] Appl. No.: 504,688

[22] Filed: Apr. 4, 1990

Related U.S. Application Data

[63] Continuation of Ser. No. 332,613, Mar. 31, 1989, abandoned.

[30] Foreign Application Priority Data

Apr. 1, 1988 [JP] Japan .................................. 63-81864

[51] Int. Cl.$^5$ ............................................. H02M 7/02
[52] U.S. Cl. ...................................... 363/63; 363/126; 323/231; 307/17
[58] Field of Search .................... 363/63, 89, 123, 125, 363/126, 127; 323/231, 267; 307/11, 15, 17

[56] References Cited

U.S. PATENT DOCUMENTS

| | | | |
|---|---|---|---|
| 3,660,672 | 5/1972 | Berger et al. | 307/17 |
| 3,723,850 | 3/1973 | Daniels et al. | 363/126 |
| 4,333,046 | 6/1982 | Lee | 323/231 |
| 4,591,728 | 5/1986 | Krüger et al. | 363/126 |
| 4,626,697 | 12/1986 | Nelson | 307/17 |
| 4,760,324 | 7/1988 | Underhill | 363/63 |

FOREIGN PATENT DOCUMENTS 0145982  1/1981  Fed. Rep. of Germany ...... 363/126

OTHER PUBLICATIONS

Smith, "Simple Supply" New Electronics, vol. 12, No. 6, 20 Mar. 1979, p. 20.

Primary Examiner—Peter S. Wong
Attorney, Agent, or Firm—Ostrolenk, Faber, Gerb & Soffen

[57] ABSTRACT

A DC power supply which is adapted to produce a DC main voltage between a main output terminal provided at one end of a first line and a ground terminal provided at one end of a second line; the power supply being characterized in that there is disposed a constant-voltage-drop means between the second line and the ground terminal; a third line extends from the second line side of the constant voltage drop means; and also an inverse polarity side output terminal is disposed at one end thereof so that an inverse polarity DC side voltage is adapted to be outputted between the inverse polarity side output terminal and the ground terminal, whereby main and side output voltage having opposite polarities can be produced through a simple construction.

6 Claims, 2 Drawing Sheets

DC POWER SUPPLY HAVING BIPOLAR OUTPUTS

This is a continuation of application Ser. No. 07/332,613 filed on Mar. 31, 1989.

BACKGROUND AND SUMMARY OF THE INVENTION

The present invention relates to a DC power supply, and more particularly, to a DC power supply which is so arranged as to an inverse polarity of DC-side voltage derived from a DC main voltage and having a simple construction.

Generally, the conventional type of DC power supply 51, as shown in FIG. 4, is adapted to output a DC high voltage +Vm (for example, 6KV) between a main output terminal p and a ground terminal g, and also, —Vs (for example, —400 V), which is an inverse polarity DC medium voltage, between an inverse polarity side output terminal n and the ground terminal g.

In order to obtain the DC high voltage +Vm as a main voltage, the output voltage Vo of a secondary-side main winding α of a transformer T is rectified and smoothed by a diode D1 and a capacitor C1.

Also, in order to obtain the inverse polarity DC medium voltage —Vs as an inverse polarity side voltage, the output voltage V1 of the secondary-side side-winding β of the transformer T is rectified and smoothed by a diode D2 and a capacitor C2. It is to be noted that reference character L1 is a main load, and reference character L2 is a side load.

The above-described conventional DC power supply 51 requires a secondary side side-winding β on a transformer T to draw out the inverse polarity side voltage, thus resulting in a larger-sized and higher-priced transformer T.

SUMMARY OF THE INVENTION

Accordingly, an object of the present invention is to provide an improved DC power supply, which is so arranged as to provide the inverse polarity DC-side voltage without requiring the secondary-side side-winding β on the transformer T.

In accomplishing this object, according to one embodiment of the present invention, there is provided a DC power supply which is adapted to output the DC main voltage between a main output terminal provided at one end of a first line and a ground terminal associated with one end of a second line. The power supply is characterized in that there is disposed a constant voltage drop means between the second line and the ground terminal; a third line is guided from the second line side of the constant voltage drop means; and, also, an inverse polarity side output terminal is disposed at one end thereof so that an inverse polarity DC-side voltage is outputted between the inverse polarity side output terminal and the ground terminal.

If the constant voltage drop means is disposed between the second line and the ground terminal, the voltage on the side of the second line of the constant and voltage drop means becomes constant opposite in polarity to the DC main voltage with respect to the ground terminal. Accordingly, a DC-side voltage opposite in polarity is outputted between the inverse polarity the side output terminal and the ground terminal. When a transformer is used, it is not necessary to have a secondary-side side-winding, because the power supply provides both the main output and the side output.

BRIEF DESCRIPTION OF THE DRAWINGS

These and other objects and features of the present invention will become apparent from the following description of preferred embodiments thereof with reference to the accompanying drawings, throughout which like parts are designated by like reference numerals, and in which.

DETAILED DESCRIPTION OF THE PREFERRED EMBODIMENTS

Figure 1:
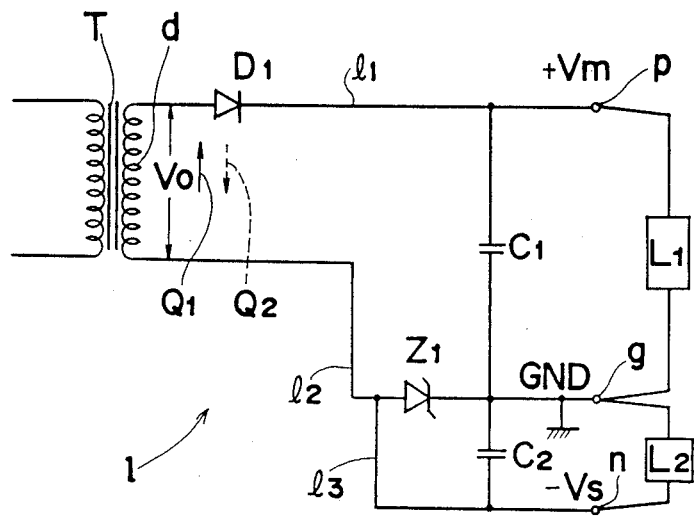
FIG. 1 is a circuit diagram of a DC power supply according to one embodiment of the present invention.

Before the description of the present invention proceeds, it is to be noted that like parts are designated by like reference numerals throughout the accompanying drawings.

In a first embodiment of the present invention as shown in FIG. 1, there is provided a DC power supply 1, wherein an anode side of a diode D1 is connected with one end of a secondary winding d of a transformer T, with the cathode side of the diode D1 being connected with one end of a first line 11.

The other end of the first line 11 is connected to a main output terminal p.

The other end of the secondary winding d of the transformer T is connected to a second line 12, with a constant-voltage-drop circuit Z1 being interposed between the second line 12 and the ground terminal g.

One zener diode or a plurality of zener diodes connected in series with each other may be used as the constant-voltage-drop circuit Z1.

A third line 13 is connected at one end to the second line 12, with a side output terminal n opposite in polarity to the main output terminal p being provided at the other end thereof.

A capacitor C1 is internally connected between the main output terminal p and the ground terminal g, with the main load L1 being externally connected in parallel with the capacitor C1. A capacitor C2 is internally connected between the opposite polarity side output terminal n and the ground terminal g, with the side load L2 being externally connected in parallel with the capacitor C2.

In the DC power supply 1, the DC main voltage +Vm is applied to the main load L1, when the voltage is outputted from the secondary winding d in the direction of the arrow Q1. At this time, only the constant voltage drop Vs appears across the constant-voltage-drop circuit Z1, so the opposite polarity DC side voltage —Vs is applied to the side load L2 through the opposite polarity side output terminal n.

When the voltage appears in the direction of the arrow Q2 across the transformer T, the power is not fed from the transformer T, but is fed from the capacitors C1, C2 into loads L1, L2 respectively.

The output voltage Vo of the secondary winding α of the transformer T is required to be adjusted so that the given DC main voltage +Vm may be obtained, taking into consideration the voltage Vs in the constant voltage drop circuit Z1.

Figure 2:
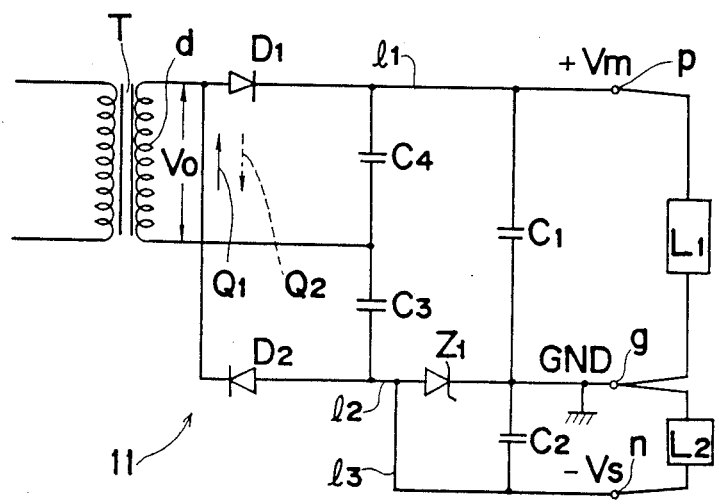
FIG. 2 is a circuit diagram of a DC power supply according to another embodiment.

In a second embodiment of the present invention, there is provided a DC power supply 11 shown in FIG. 2 wherein the circuit for supplying the opposite polarity DC side voltage—Vs is similar to that in FIG. 1 although it is different from the circuit for supplying +Vm. A DC power supply 1 of the first embodiment in; the voltage almost twice as large as the output voltage Vo of the secondary winding d of the transformer T is supplied as the DC main voltage +Vm.

A capacitor C3 is provided within the second line 12 between the secondary winding of the transformer T and the zener diode Z1. A capacitor C4 is provided between the first line 11 and second line 12 and thereby forming a series connection between the line 11 and the zener diode Z1 with the capacitor C3. A diode D2 is provided between a mode of the secondary winding of the transformer T and the diode D1 and a mode of the zener diode Z1 and the capacitor C3.

When voltage appears in direction of the arrow Q2 across the secondary winding d of the transformer T, the capacitor C3 is charged through the diode D2. Then, when secondary voltage appears in the direction of the arrow Q1, the voltage supplied by the charged capacitor C3 is added to the secondary voltage of the transformer T, so that a voltage almost twice as large as the output voltage Vo of the secondary winding d of the transformer T is applied to the main load L1 as the DC main voltage +Vm. As in the embodiment of FIG. 1, the constant voltage drop Vs provided by the constant voltage drop circuit Z1 is applied to the side load L2 through the inverse polarity output terminal n.

Figure 3:
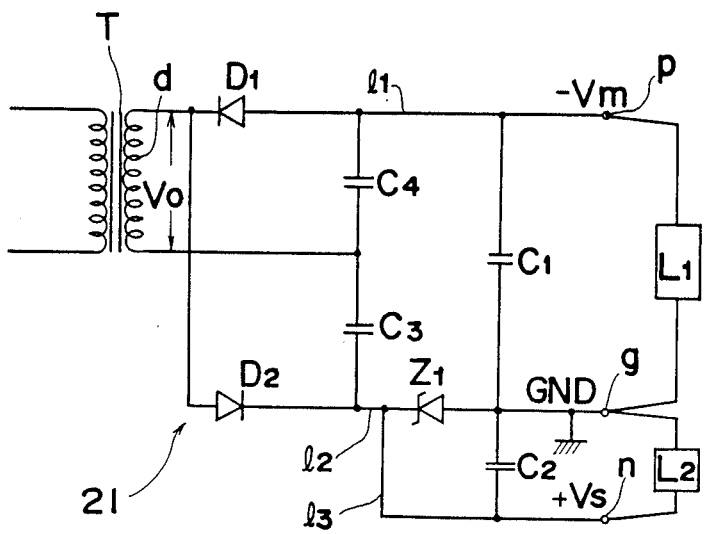
FIG. 3 is a circuit diagram of a DC power supply according to still another embodiment.
Figure 4:
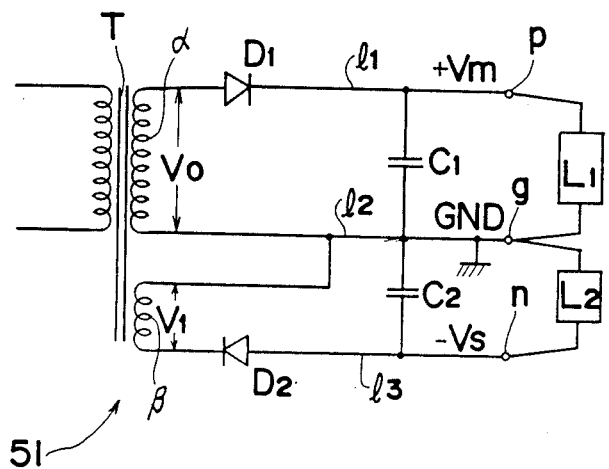
FIG. 4 is a circuit diagram of the conventional DC power supply, as already referred to above.

Although the first and second embodiments of the DC power supplies 1 and 11 supply a main output voltage with positive polarity and supply a side output voltage with negative polarity, it is easy to render the polarity of the main output negative and the polarity of the side output positive through the inversion of the diodes D1, D2 and the constant voltage-drop circuit Z1 in the directions shown in FIG. 3 as a third embodiment of the present invention. The DC power supply 21 of FIG. 3 is one example of having negative polarity for the main output and positive polarity for the side output, wherein the diodes D1, D2, Z1 are positioned in the directions opposite to those of the diodes in the second embodiment of FIG. 2.

As is apparent from the foregoing description, according to the arrangement of the present invention, there is provided a DC power supply which is adapted to produce a DC main voltage between a main output terminal provided at one end of a first line and a ground terminal associated with one end of a second line; the power supply being characterized in that there is disposed a constant-voltage-drop means between the second line and the ground terminal; a third line is guided from the second line side of the constant voltage drop means; and, also, an inverse polarity side output terminal is disposed at one end thereof so that an inverse polarity DC side voltage is adapted to be outputted between the inverse polarity side output terminal and the ground terminal. Therefore, a main output and a side output having opposite polarities are adapted to be produced through a simple construction.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A DC power supply, including a transformer with a secondary winding, which outputs a DC main voltage between a main output terminal coupled to one end of a first line from said power supply, and a ground terminal coupled to one end of a second line from said power supply;

further comprising a constant-voltage-drop means coupling the second line and the ground terminal; a third line extending from the second line side of the constant-voltage-drop means; an inverse-polarity-side output terminal provided at one end of the third line, so that a substantially constant DC inverse-polarity side voltage is outputted between the inverse-polarity-side output terminal and the ground terminal;

the DC main voltage being variable according to an amplitude of a voltage appearing across the secondary winding.

2. The DC power supply as defined in claim 1, wherein said constant-voltage-drop means comprises at least one zener diode.

3. A DC power supply as in claim 1, wherein: said DC main voltage is supplied to said first line by a diode, said diode being connected to an end tap of said secondary winding and providing half-wave rectification;

said second line is connected directly to an opposite end tap of said secondary winding; and said third line directly interconnects said second line and said side output terminal.

4. A DC power supply comprising a transformer provided with a secondary winding having first and second ends; a first diode connected at one of its ends to the first end of the secondary winding providing half-wave rectification of a voltage across said secondary winding; a first line connected at one of its ends to the other end of the diode and at its other end to a main output terminal; a second line connected at one of its ends directly to the second end of the secondary winding; constant-voltage-drop means provided between the other end of the second line and a ground terminal; a third line connected at one of its ends to the second line and at its other end to a side output terminal; a first capacitor connected between the main output terminal and the ground terminal, and means to connect an external main load in parallel with the first capacitor; a second capacitor connected between the side output terminal and the ground terminal, and means to connect an external side load in parallel with the second capacitor; the DC power supply providing a DC main voltage between the main output terminal and the ground terminal which is variable according to an amplitude of a voltage appearing across the secondary winding.

5. The DC power supply as defined in claim 4, wherein said constant-voltage-drop means comprises at least one zener diode.

6. A DC power supply as in claim 4, wherein:
said second line includes a third capacitor whereby said third capacitor connects said second end of said secondary winding to said constant-voltage-drop means; and further comprising a fourth capacitor connected between the first end and the second end of said secondary winding; and a second diode connects the first end of the secondary winding to the junction between the third capacitor and said constant-voltage-drop means;
said first diode being biased to pass current out of said first end, and said second diode being biased to pass current into said first end of said secondary winding;
whereby a voltage appearing across said third capacitor contributes to said DC main voltage.

* * * * *